United States Patent
Antolovic et al.

(10) Patent No.: US 11,982,566 B2
(45) Date of Patent: May 14, 2024

(54) SYSTEM, DEVICE, AND METHOD FOR QUANTUM CORRELATION MEASUREMENT WITH SINGLE PHOTON AVALANCHE DIODE ARRAYS

(71) Applicants: ECOLE POLYTECHNIQUE FEDERALE DE LAUSANNE (EPFL), Lausanne (CH); Yeda Research & Development Co. Ltd., Rehovot (IL)

(72) Inventors: Ivan Michel Antolovic, Lausanne (CH); Claudio Bruschini, Villars-sous-Yens (CH); Edoardo Charbon, Jouxtens-Mezery (CH); Gur Lubin, Tel Aviv (IL); Ron Tenne, Rehovot (IL); Dan Oron, Rehovot (IL); Uri Rossman, Tel Aviv (IL)

(73) Assignees: ECOLE POLYTECHNIQUE FEDERALE DE LAUSANNE (EPFL), Lausanne (CH); YEDA RESEARCH & DEVELOPMENT CO. LTD., Rehovot (IL)

( * ) Notice: Subject to any disclaimer, the term of this patent is extended or adjusted under 35 U.S.C. 154(b) by 39 days.

(21) Appl. No.: 17/442,145

(22) PCT Filed: Feb. 28, 2020

(86) PCT No.: PCT/IB2020/051725
§ 371 (c)(1),
(2) Date: Sep. 23, 2021

(87) PCT Pub. No.: WO2020/201849
PCT Pub. Date: Oct. 8, 2020

(65) Prior Publication Data
US 2022/0170784 A1    Jun. 2, 2022

(30) Foreign Application Priority Data

Mar. 29, 2019    (WO) .................. PCT/IB2019/052621

(51) Int. Cl.
*G01J 1/44*     (2006.01)
*G01J 1/42*     (2006.01)

(52) U.S. Cl.
CPC ............... *G01J 1/44* (2013.01); *G01J 1/4228* (2013.01); *G01J 2001/442* (2013.01); *G01J 2001/444* (2013.01); *G01J 2001/4466* (2013.01)

(58) Field of Classification Search
CPC ...... G01J 1/44; G01J 1/4228; G01J 2001/442; G01J 2001/444; G01J 2001/446
See application file for complete search history.

(56) References Cited

U.S. PATENT DOCUMENTS 7,262,402 B2    8/2007    Niclass et al.
7,547,872 B2    6/2009    Niclass et al.
(Continued)

OTHER PUBLICATIONS

Tenne et al. ("Super-Resolution enhancement by Quantum Image Scanning Microscopy", Nature Photonics, vol. 13, pp. 116-122, Feb. 2019) (Year: 2019).*

(Continued)

*Primary Examiner* — Jennifer D Bennett
(74) *Attorney, Agent, or Firm* — Nixon & Vanderhye P.C.

(57) ABSTRACT

A system for photon correlation of an illuminated object and/or a light source is provided. The system includes a light source for illuminating the object and an optical system having an object-facing side configured to face the object or the light source and a projection side with the projection side having a focal plane. The system also includes a single-chip single photon avalanche photodiode (SPAD) array arranged at the focal plane and a timing circuit associated with the (Continued)

single-chip SPAD array for measuring arrival times of photons detected by the single-chip SPAD array.

16 Claims, 11 Drawing Sheets

(56) References Cited

U.S. PATENT DOCUMENTS

| | | | |
|---|---|---|---|
| 7,858,917 | B2 | 12/2010 | Stern et al. |
| 7,898,001 | B2 | 3/2011 | Richardson et al. |
| 8,168,934 | B2 | 5/2012 | Niclass et al. |
| 8,355,117 | B2 | 1/2013 | Niclass |
| 8,810,647 | B2 | 8/2014 | Niclass et al. |
| 10,079,608 | B2 | 9/2018 | Kumar et al. |
| 2015/0097951 | A1* | 4/2015 | Barrows .............. H04N 25/587 901/1 |
| 2016/0218236 | A1* | 7/2016 | Dhulla ................. H01L 27/1443 |
| 2019/0068279 | A1* | 2/2019 | Shaw .................. H04N 25/772 |
| 2019/0250257 | A1* | 8/2019 | Finkelstein ........... G01S 7/4863 |
| 2020/0036918 | A1* | 1/2020 | Ingle ................. H01L 27/14625 |

OTHER PUBLICATIONS

Abbe, E. (1873). Beiträge zur Theorie des Mikroskops und der mikroskopischen Wahrnehmung. Archiv für mikroskopische Anatomie, 9(1), 413-468.

Achilles, D., Silberhorn, C., Śliwa, C., Banaszek, K., & Walmsley, I. A. (2003). Fiber-assisted detection with photon number resolution. Optics letters, 28(23), 2387-2389.

Antolovic, I. M., Bruschini, C., & Charbon, E. (2018). Dynamic range extension for photon counting arrays. Optics express, 26(17), 22234-22248.

Antolovic, I. M., Burri, S., Bruschini, C., Hoebe, R. A., & Charbon, E. (2017). SPAD imagers for super resolution localization microscopy enable analysis of fast fluorophore blinking. Scientific reports, 7(1), 1-11.

Aull, B. F., Schuette, D. R., Young, D. J., Craig, D. M., Felton, B. J., & Warner, K. (2014). A Study of Crosstalk in a "256\times 256" Photon Counting Imager Based on Silicon Geiger-Mode Avalanche Photodiodes. IEEE Sensors Journal, 15(4), 2123-2132.

Brida, G., Degiovanni, I. P., Piacentini, F., Schettini, V., Polyakov, S. V., & Migdall, A. (2009). Scalable multiplexed detector system for high-rate telecom-band single-photon detection. Review of Scientific Instruments, 80(11), 116103.

Bronzi, D., Villa, F., Tisa, S., Tosi, A., & Zappa, F. (2015). SPAD figures of merit for photon-counting, photon-timing, and imaging applications: a review IEEE Sensors Journal, 16(1), 3-12.

Brown, R. H., & Twiss, R. Q. (1956). 2. A Test of a New Type of Stellar Interferometer on Sirius. In A Source Book in Astronomy and Astrophysics, 1900-1975 (pp. 8-12). Harvard University Press.

Bruschini, C., Homulle, H., & Charbon, E. (Feb. 2017). Ten years of biophotonics single-photon SPAD imager applications: retrospective and outlook. In Multiphoton Microscopy in the Biomedical Sciences XVII (vol. 10069, p. 100691S). International Society for Optics and Photonics.

Burri, S., Homulle, H., Bruschini, C., & Charbon, E. (Apr. 2016). LinoSPAD: a time-resolved 256×1 CMOS SPAD line sensor system featuring 64 FPGA-based TDC channels running at up to 8.5 giga-events per second. In Optical Sensing and Detection IV (vol. 9899, p. 98990D). International.

Cabrera, B., Clarke, R. M., Colling, P., Miller, A. J., Nam, S., & Romani, R. W. (1998). Detection of single infrared, optical, and ultraviolet photons using superconducting transition edge sensors. Applied Physics Letters, 73(6), 735-737.

Castello, M., Tortarolo, G., Buttafava, M., Deguchi, T., Villa, F., Koho, S., . . . & Vicidomini, G. (2019). A robust and versatile platform for image scanning microscopy enabling super-resolution FLIM. Nature methods, 16(2), 175-178.

Divochiy, A., Marsili, F., Bitauld, D., Gaggero, A., Leoni, R., Mattioli, F., . . . & Fiore, A. (2008). Superconducting nanowire photon-number resolving detector at telecommunication wavelengths. Nature Photonics, 2(5), 302-306.

Eisaman, M. D., Fan, J., Migdall, A., & Polyakov, S. V. (2011). Invited review article: Single-photon Sources and detectors. Review of scientific instruments, 82(7), 071101.

Eraerds, P., Legré, M., Rochas, A., Zbinden, H., & Gisin, N. (2007). SiPM for fast photon-counting and multiphoton detection. Optics Express, 15(22), 14539-14549.

Fickler, R., Krenn, M., Lapkiewicz, R., Ramelow, S., & Zeilinger, A. (2013). Real-time imaging of quantum entanglement. Scientific reports, 3(1), 1-5.

Ficorella, A., Pancheri, L., Dalla Betta, G. F., Brogi, P., Collazuol, G., Marrocchesi, P. S., . . . & Savoy-Navarro, A. (Sep. 2016). Crosstalk mapping in CMOS SPAD arrays. In 2016 46th European Solid-State Device Research Conference (ESSDERC) (pp. 101-104). IEEE.

Fitch, M. J., Jacobs, B. C., Pittman, T. B., & Franson, J. D. (2003). Photon-number resolution using time-multiplexed single-photon detectors. Physical Review A, 68(4), 043814.

Gansen, E. J., Rowe, M. A., Greene, M. B., Rosenberg, D., Harvey, T. E., Su, M. Y., . . . & Mirin, R. P. (2007). Photon-number discriminating detection using a quantum-dot, optically gated, field-effect transistor. Nature Photonics, 1(10), 585-588.

Hadfield, R. H. (2009). Single-photon detectors for optical quantum information applications. Nature Photonics, 3(12), 696-705.

International Search Report dated Sep. 8, 2020, for Application N° PCT/IB2020/051725.

Jiang, L. A., Dauler, E. A., & Chang, J. T. (2007). Photon-number resolving detector with 10 bits of resolution. Physical Review A, 75(6), 062325.

Kim, J., Takeuchi, S., Yamamoto, Y., & Hogue, H. H. (1999). Multiphoton detection using visible light photon counter. Applied Physics Letters, 74(7), 902-904.

Kimble, H. J., Dagenais, M., & Mandel, L. (1977). Photon antibunching in resonance fluorescence. Physical Review Letters, 39(11), 691.

Kindt, W. J., Van Zeijl, H. W., & Middelhoek, S. (Sep. 1998). Optical cross talk in geiger mode avalanche photodiode arrays: modeling, prevention and measurement. In 28th European Solid-State Device Research Conference (pp. 192-195). IEEE.

Klimov, V. I., Mikhailovsky, A. A., McBranch, D. W., Leatherdale, C. A., & Bawendi, M. G. (2000). Quantization of multiparticle Auger rates in semiconductor quantum dots. Science, 287(5455), 1011-1013.

Kröger, J., Ahrens, T., Sperling, J., Vogel, W., Stolz, H., & Hage, B. (2017). High intensity click statistics from a 10× 10 avalanche photodiode array. Journal of Physics B: Atomic, Molecular and Optical Physics, 50(21), 214003.

Kruse, R., Tiedau, J., Bartley, T. J., Barkhofen, S., & Silberhorn, C. (2017). Limits of the time-multiplexed photon-counting method. Physical Review A, 95(2), 023815.

Lita, A. E., Miller, A. J., & Nam, S. W. (2008). Counting near-infrared single-photons with 95% efficiency. Optics express, 16(5), 3032-3040.

Luo, W., Weng, Q., Long, M., Wang, P., Gong, F., Fang, H., . . . & Lu, W. (2018). Room-temperature single-photon detector based on single nanowire. Nano letters, 18(9), 5439-5445.

Lussana, R., Villa, F., Dalla Mora, A., Contini, D., Tosi, A., & Zappa, F. (2015). Enhanced single-photon time-of-flight 3D ranging. Optics Express, 23(19), 24962-24973.

Miatto, F. M., Safari, A., & Boyd, R. W. (2018). Explicit formulas for photon number discrimination with on/off detectors. Applied optics, 57(23), 6750-6754.

Michler, P., Kiraz, A., Becher, C., Schoenfeld, W. V., Petroff, P. M., Zhang, L., . . . & Imamoglu, A. (2000). A quantum dot single-photon turnstile device. science, 290(5500), 2282-2285.

Miuda, M., Haderka, O., & Jeězk, M. (2008). High-efficiency photon-number-resolving multichannel detector. Physical Review A, 78(2), 025804.

(56) References Cited

OTHER PUBLICATIONS

Miller, A. J., Nam, S. W., Martinis, J. M., & Sergienko, A. V. (2003). Demonstration of a low-noise near-infrared photon counter with multiphoton discrimination. Applied Physics Letters, 83(4), 791-793.

Müller, C. B., & Enderlein, J. (2010). Image scanning microscopy. Physical review letters, 104(19), 198101.

Rech, I., Ingargiola, A., Spinelli, R., Labanca, I., Marangoni, S., Ghioni, M., & Cova, S. (2008). Optical crosstalk in single photon avalanche diode arrays: a new complete model. Optics express, 16(12), 8381-8394.

Schwartz, O., Levitt, J. M., Tenne, R., Itzhakov, S., Deutsch, Z., & Oron, D. (2013). Superresolution microscopy with quantum emitters. Nano letters, 13(12), 5832-5836.

Stevens, M. J., Glancy, S., Nam, S. W., & Mirin, R. P. (2014). Third-order antibunching from an imperfect single-photon source. Optics express, 22(3), 3244-3260.

Ta, H., Kiel, A., Wahl, M., & Herten, D. P. (2010). Experimental approach to extend the range for counting fluorescent molecules based on photon-antibunching. Physical Chemistry Chemical Physics, 12(35), 10295-10300.

Tenne, R., Rossman, U., Rephael, B., Israel, Y., Krupinski-Ptaszek, A., Lapkiewicz, R., . . . & Oron, D. (2019). Super-resolution enhancement by quantum image scanning microscopy. Nature Photonics, 13(2), 116-122.

Vacheret, A., Barker, G. J., Dziewiecki, M., Guzowski, P., Haigh, M. D., Hartfiel, B., . . . & Ziembicki, M. (2011). Characterization and simulation of the response of Multi-Pixel Photon Counters to low light levels. Nuclear Instruments and Methods in Physics Research Section A: Accelerators, Spectrometers,.

Villa, F., Markovic, B., Bellisai, S., Bronzi, D., Tosi, A., Zappa, F., . . . & Brockherde, W. (2012). SPAD smart pixel for time-of-flight and time-correlated single-photon counting measurements. IEEE Photonics Journal, 4(3), 795-804.

Waks, E., Inoue, K., Oliver, W. D., Diamanti, E., & Yamamoto, Y. (2003). High-efficiency photon-number detection for quantum information processing. IEEE Journal of selected topics in quantum electronics, 9(6), 1502-1511.

Written Opinion of the ISA dated Sep. 8, 2020 for Application N° PCT/IB2020/051725.

\* cited by examiner c  Single QD

SYSTEM, DEVICE, AND METHOD FOR QUANTUM CORRELATION MEASUREMENT WITH SINGLE PHOTON AVALANCHE DIODE ARRAYS

CROSS-REFERENCE TO RELATED APPLICATIONS

The present patent application is an United States national stage application of International Patent Application with the Application Serial No. PCT/IB2020/051725 that was filed on Feb. 28, 2020 designating the United States, and claims foreign priority to International Patent Application with the Application Serial No. PCT/IB2019/052621 that was filed on Mar. 29, 2019, the entire contents of these two documents herewith incorporated by reference in their entirety.

FIELD OF THE INVENTION

The present invention relates to the field of quantum analysis of light at the single photon level, more specifically quantum correlation measurements that use avalanche diodes, and avalanche diode arrays, and methods of measuring and analyzing the data from the avalanche diode arrays.

BACKGROUND

Measuring photon correlations is paramount to the analysis of quantum properties of light and their application in emerging quantum technologies. The Hanbury Brown and Twiss (HBT) intensity interferometer achieves that by splitting the beam onto two detectors with a beam splitter, as exemplarily shown in FIG. 1A and correlating their output. However, when higher order correlations or photon number resolving (PNR) capabilities are desired, this scheme has limited scalability, dictating cumbersome and costly optical setups. There are two alternative approaches to enable these measurements: a single PNR detector or multiplexed (temporally or spatially) single photon detectors.

Single detector PNR schemes, such as visible light photon counters (VLPC), superconducting transition edge sensors (TES), and nanostructured transistor devices, rely on the proportionality of the output signal to the number of photons. These techniques allow high efficiency detection with very low noise levels, and are free of multiplexing artifacts. However, they demand cryogenic cooling, dedicated fabrication processes, have a limited saturation rate and often require optical coupling through a cavity for high efficiency operation. Time multiplexing of a single photon detector is typically achieved by splitting the signal to different fiber delay lines. While this approach enables PNR with only one inexpensive single-photon detector, it requires the use of very long fibers and is currently limited to single spatial mode signals. Finally, by utilizing a two dimensional detector array, the diffraction of light can be used as a natural beam splitter onto an arbitrarily large number of detectors.

The related challenge of photon correlation imaging can also be addressed with two-dimensional (2D) detector arrays. Intensified cameras and electron multiplying charge coupled devices (EMCCD) can be utilized as Geiger mode imagers with single photon sensitivity. However, acquisition rates for both are limited to the few kHz regime, dictating very long exposure times for sufficient statistics. Additionally, intensified cameras feature low quantum efficiencies, while EMCCD suffer from a high rate of false positive detections.

Over the past two decades, progress in complementary metal-oxide-semiconductor (CMOS) processing of single photon avalanche photodiode (SPAD) array technology has positioned them at the forefront of time resolved imaging. Advancements in array dimensions, detection efficiencies and low dark current rates (DCR), along with the inherent single photon sensitivity and sub nanosecond time resolution enable a plethora of low light level applications. However, a major challenge to their implementation in photon correlation measurements, is the characteristic crosstalk between neighboring detectors in the array. While this has a negligible effect on intensity measurements, it directly competes with the short-time photon correlation signal, and is typically of a much larger scale.

Therefore, in light of the above-discussed deficiencies of the background art, substantially improved avalanche diode arrays for single photon detection are strongly desired.

SUMMARY

According to one aspect of the present invention, a system for photon correlation of an illuminated object and/or a light source is provided. The system preferably includes a light source for illuminating the object or to correlate, an optical system having an object-facing side configured to face the object or the light source and a projection side, the projection side having a focal plane, a single-chip single photon avalanche photodiode (SPAD) array arranged at the focal plane, and a timing circuit associated with the single-chip SPAD array for measuring arrival times of photons detected by the single-chip SPAD array.

According to another aspect of the present invention, a method for characterizing cross-talk probabilities with a system for photon correlation is provided. The system preferably includes a classical or pseudo-thermal light source for illuminating the object or to correlate, an optical system having an object-facing side configured to face the object or the light source and a projection side, the projection side having a focal plane, a single-chip single photon avalanche photodiode (SPAD) array arranged at the focal plane, and a timing circuit associated with the single-chip SPAD array for measuring arrival times of photons detected by the single-chip SPAD array. Moreover, preferably the method includes the step of analyzing photon correlations from the classical or pseudo-thermal light source.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 2B shows the characterization of crosstalk dependence on inter-detector distance. Each bar shows the crosstalk probability averaged over all detector pairs at a certain distance. Error bars represent one standard deviation of the distribution over these pairs. The values suggest that crosstalk is significant mostly for neighboring detectors, as shown in the inset. Visualization of neighbor rank is shown in the inset of FIG. 2B. A photon represented by the arrow is absorbed in the upper left detector. The neighboring detectors are ranked by distance from the excited detector. FIG. 2C shows crosstalk linearity in measured light intensity. Each set of markers represent a neighboring (rank 1) detector pair. Lines represent a linear fit for each pair, and FIG. 2D schematically shows clock skew for different pixels;

FIG. 3C shows single QD, and FIG. 3D shows single QD after crosstalk correction. The correlation peaks are centered at integer multiples of the laser inter-pulse separation (400 ns) broadened by the QDs emission lifetime (~26 ns). In FIGS. 3A and 3C, the high crosstalk peaks at zero time delay can be clearly seen. In FIG. 3B, the zero delay peak is nearly identical to non-zero peaks, as expected for classical light source following Poissonian statistics. The zero delay peak in FIG. 3D is significantly lower than the non-zero delay peaks, as expected from an antibunched light source. Classical and single QD correlation curves where analyzed from $10^7$ detections over ~103 s and $8 \cdot 10^6$ detections over ~105 s respectively. Moreover FIG. 3E shows normalized value of the second order correlation function after crosstalk correction for 24 single QD measurements, showing a narrow distribution with an average value of ~0.14;

FIG. 4C shows three possible pathways for crosstalk to form false $G^{(3)}(0,0)$ triplets from real photons (squiggly arrows) and crosstalk events (straight arrows). Moreover, FIG. 4D, a histogram of crosstalk corrected $G^{(3)}(0,0)$ values from different QDs. A mean value of 0.12 indicates antibunching, while the single negative value is due to crosstalk over-correction.

FIG. 5A shows a confocal laser scanning microscopy (CLSM) image, summing counts over all detectors for each scan position. FIG. 5B shows an image scanning microscopy (ISM) image analyzed from the same data set, the intensity image generated by each detector is shifted before summation. FIG. 5C shows a Q-ISM image—$\Delta G^{(2)}$ for each detector pair is shifted and then summed. FIG. 5D represents the cross-sections for the different analyses: CLSM (circles), ISM (x markers) and Q-ISM (squares). The values for the CLSM cross section were radially averaged to reduce blinking artifacts. These artifacts do not affect ISM and Q-ISM images, and the scale bar is chosen at 0.25 µm.

Herein, identical reference numerals are used, where possible, to designate identical elements that are common to the figures. Also, the images are simplified for illustration purposes and may not be depicted to scale.

DETAILED DESCRIPTION OF THE SEVERAL EMBODIMENTS

Figure 1A:
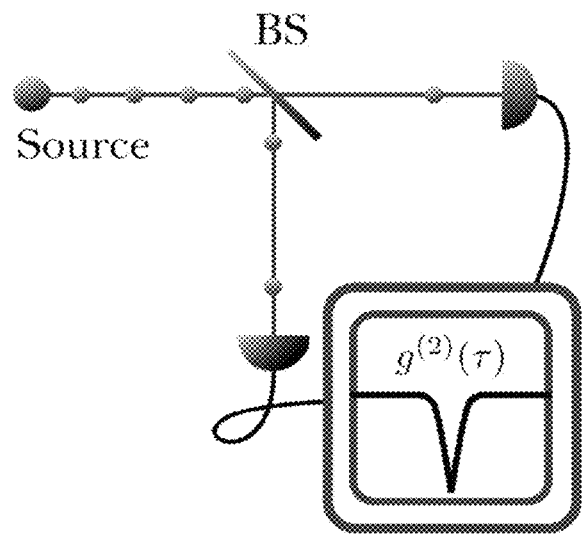
FIGS. 1A, 1B and 1C show different exemplary photon correlation systems, with FIG. 1A showing an exemplary representation of a Hanbury Brown and Twiss intensity interferometer according to the state of the art, where a beam splitter splits the incident photons to two correlated detectors. A single photon emitter source will be characterized by a dip at the zero time delay of the second order photon correlation. Higher order correlations demand more beam splitters and detectors, and FIG. 1B showing an exemplary and schematic representation of the system 100 or device, and FIG. 1C showing an exemplary representation or embodiment of a SPAD array 30 photon correlation system. A SPAD array 30 is positioned at the image plane or focal plane 35 of a scanning confocal microscope, resulting in splitting of the beam onto an exemplary number of twenty-three (23) detectors, as shown in the inset, and an optical image of the SPAD array is also shown.
Figure 1C:
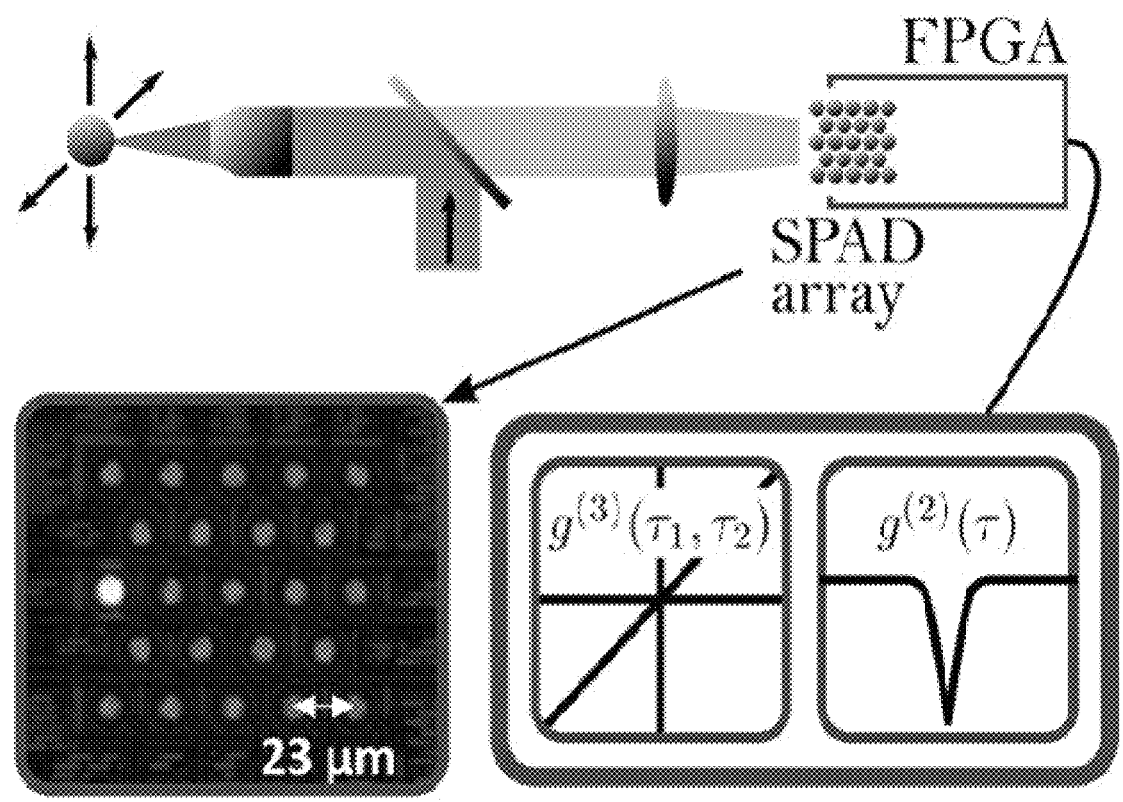
Figure 1B:
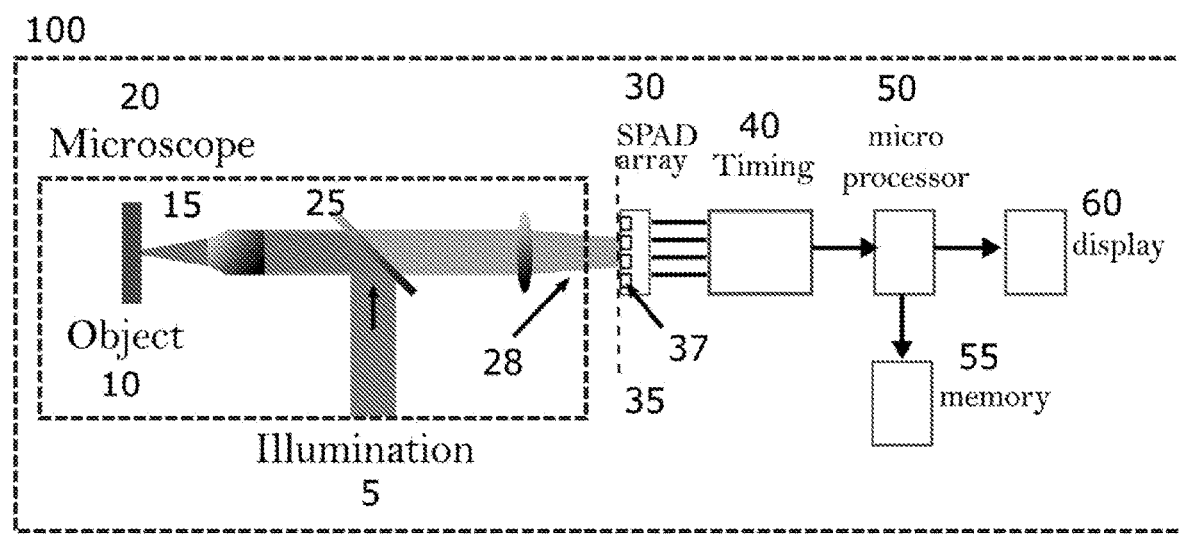

According to an aspect of the present invention, as exemplarily shown in FIG. 1B, a system 100 is provided for inspecting or measuring quantum imaging characteristics or analyzing quantum characteristics of an object, sample or device-under-test 10, the system 100 including a light source 5 or illumination device for illuminating sample 10 with an illumination light beam 15, for example via a dichroic or semi-transparent mirror 25. Sample 10 can be but is not limited to a biological specimen labeled with fluorescent markers or a sample containing fluorescent markers with a non-trivial correlation at short time delays. In the variant shown, the illumination is done indirectly via mirror 25, but other types of illumination are also possible, for example illumination that is transmissive through object 10, or a combination of transmissive and reflective illumination. The illumination source can be a focused laser beam or other light source, spatially filtered in order to focus to a diffraction limited spot. In a variant, light source 5 can include a light source initialized in a quantum state of light. Moreover, system 100 further includes an optical system 20, for example but not limited to a confocal microscope architecture, or an inverted microscope architecture, and optical system 20 preferably includes an objective lens, for example one that provides for a high magnification and numerical aperture, for providing a focused magnified projection beam 28 to focal plane 35 of optical system 20, a single photon avalanche photodiode (SPAD) array 30, having a plurality of avalanche photodiode pixels 37, arranged to match the focal plane 35 of objective lens system 20, a timing readout circuit 40, circuit 40 possibly integrated on the same integrated circuit or on the same printed circuit board of the SPAD array 30 for measuring, in parallel for the different pixels 37 of the SPAD array 30, the arrival times of single photons arriving at each pixel of the SPAD array 30. As another example, one can measure the correlation in the light source 5 itself by exchanging the sample with a reflecting mirror 25 or by illuminating the SPAD array 30 directly with, for example, a light source 5 initialized in a quantum state of light.

Moreover, system 100 further includes a computer 50 or other type of data processing device, such as but not limited to a personal computer (PC), Macintosh computer (Mac), digital signal processor (DSP), microcontroller, microprocessor, field programmable gate array (FPGA), programmable logic device (PLD), the computer associated with memory 55 for the data processing, operatively connected to timing circuit 40, or to SPAD array 30, or both, for receiving the arrival times of the photons at the pixels 37 of SPAD array 30, and for calculating multiple orders of correlation in the arrival time of photons. Moreover, a display device 60 can be provided to visualize the result of the data processing, for example a super resolved Q-ISM and/or ISM images of a biological sample, a second and third or fourth order correlation function of photon arrival time from a quantum dot, molecule or other sources of quantum light or sources of classical light with rapid fluctuations, for example fluctuations beyond the frame rate of an imaging device, for example an CCD camera. Also, it is possible to display on display device 60 a photon number histogram measurements of any of the sources described above. The system 100 is presented herein including several elements, but it is also possible that the system 100 is presented as a single device, and according to another aspect of the present invention, a method is presented for operating the system 100 or device.

As further shown in FIG. 1C, a novel SPAD array 30 is presented, exemplarily having twenty-three (23) SPAD pixels, fabricated with standard CMOS technology, to measure photon correlations from faint sources by statistically compensating for crosstalk artifacts. Twenty-three (23) SPAD pixels is exemplary, and other pixel counts and pixel densities are also possible. The detector array is placed at the image plane or focal plane 35 of a high magnification inverted microscope as an exemplary microscopy system 20 and connected to a field-programmable gate array (FPGA) circuit, to implement the timing circuit 40, the circuit 40 recording photon arrival times at the SPAD array 30. It is also possible that the timing circuit for each pixel of the SPAD array 30 is incorporated into each pixel, to provide for a smart pixel architecture in CMOS technology, to provide for an integrated element for both SPAD array 30 and timing circuit or device 40, for example as shown in U.S. Pat. No. 7,858,917, or in U.S. Pat. No. 7,547,872 these references herewith incorporated by reference in their entirety.

Crosstalk between the different detectors in SPAD array 30 can be characterized with a classical light reference, that can be used for light source 5, for example by direct or indirect illumination or by placing a reflective object in place of the sample 10. This is then utilized to compensate for the crosstalk artifact, and demonstrate reliable measurements of second and third order photon correlations, as well as quantum optical enabled super-resolution, with the Q-ISM technique, as discussed in the reference 29, this reference herewith incorporated by reference in its entirety.

With respect to the crosstalk characterization, recent progress in the design and manufacture processes of CMOS-based SPAD arrays 30 led to sub-megapixel arrays, DCR in the 100 Hz per pixel and improved fill factors. Herein, a small array is presented, optimized for confocal microscopy with to measure quantum correlations in a microscopy settings. The exemplary SPAD array 30 includes twenty-three (23) pixels positioned in a two-dimensional 2D hexagonal lattice with an exemplary period or pixel pitch of 23 μm. Pixels with less than 10 μm have been also demonstrated. The majority of pixels in the implemented 2D hexagonal lattice has a DCR lower than 100 Hz, while CMOS SPADs typically have a DCR between 100 and 10'000 cps. "Hot pixels" are space-randomly distributed pixels with high DCR. The percentage of "hot pixels" in the implemented design is 2%. A smaller pixel size enables higher pixel resolution, lower DCR and lower percentage of "hot pixels", but decreases the fill factor. The pixel size should thus be optimized considering the application. DCR, photon detection probability (PDP), dynamic range and afterpulsing are often discussed in the state of the art, but only a few works discuss the issue of inter-pixel crosstalk, see for example references 26, 27, 30, 31 cited below, these references herewith incorporated by reference in their entirety. While both afterpulsing and crosstalk generate artificial correlations, afterpulsing artifacts are avoided here altogether by disregarding the autocorrelation of any single detector, as typically done in HBT experiments. In the remainder of this section we describe in detail the characterization procedure of the inter-pixel optical crosstalk and its results.

To characterize crosstalk, the SPAD array 30 was illuminated with a light source having a spatially homogeneous, white light illumination produced by a halogen lamp, as light source 5. The pseudo-thermal state of light generated by the lamp leads to positive correlations, also referred to as photon bunching, at the scale of the coherence time, $\tau_c \sim 10$ fs, much shorter than the FPGA timing resolution $t_{clk}=10$ ns. Correlations measured with a $t_{clk}$ temporal resolution should thus present only a minute deviation from those of a classical coherent state. As a result, the light source can be considered as effectively uncorrelated, and isolate the correlations due to inter detector crosstalk.

For a classical coherent state, the second order correlation $(G^{(2)}(\tau))$ of photon arrival times should result in a flat line. However, as is evident from FIG. 2A, $G^{(2)}(\tau)$ of two neighbouring detectors shows a distinct peak at zero time delay. These extra photon pairs at zero time delay are attributed to inter-detector optical crosstalk, resulting from detection of photons emitted during the avalanche process by a neighboring detector in the array, see reference 26.

Figure 2A:
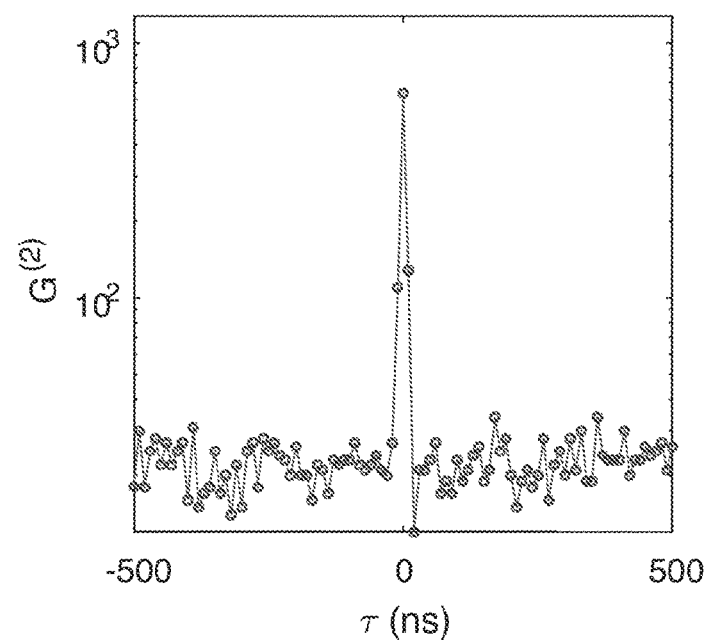
FIGS. 2A-2C shows different graphs that represent a SPAD array crosstalk characterization, with FIG. 2A showing a typical second order correlation of photon arrival times for two neighboring detectors in the SPAD array, in response to homogeneous illumination by a pseudo-thermal source, analyzed from $10^7$ detections over ~43 seconds. Note the sharp peak at zero time delay attributed to crosstalk.

Crosstalk in SPADs can be electrical or optical crosstalk. Electrical crosstalk is minimized by a substrate isolated SPAD design, while optical crosstalk can be minimized by active quenching and/or by implementing opaque deep trench isolation. In such an optimized SPAD implementation, the electrical crosstalk is eliminated and optical crosstalk occurs only by means of photon reflection from the metal connections on top/side of the SPAD. The time scale of the optical crosstalk positive correlation is dictated by the avalanche rise time, during which spontaneous photons can be emitted. However, due to small differences (skews) in clock timings for different detectors, some crosstalk events are measured with a time difference of one clock, giving rise to some positive correlation also at $\tau=\pm10$ ns, as shown in FIG. 2A. These correlations can be corrected for, but special care must be taken in the characterization. A uniform-in-time light illumination will yield correlation estimates at $\tau=\pm10$ ns proportional to the ratio between the skew and the clock period. However, if a pulsed illumination is employed, correlation estimates at $\tau=\pm10$ ns can vary from 0 to 100% of the total crosstalk between two (2) pixels, as schematically and exemplarily shown in FIG. 2D representing skew in clock timings for different pixels.

The above mentioned mechanism for optical crosstalk implies that the mean number of detected crosstalk pairs is linear with the number of detected photons up to detector saturation effects. We can therefore define the crosstalk probability $p_{i,j}^{CT}$ as the probability that a detection in pixel i will lead to a false detection at detector j. The crosstalk probabilities for each detector pair can be inferred from the $G^{(2)}(\tau)$ analysis of a single 'classical light' measurement according to Equation (1) below:

$$p_{i,j}^{CT} = \frac{G_{i,j}^{(2)}(0) - G_{i,j}^{(2)}(\infty)}{n_i + n_j} \quad \text{Eq. (1)}$$

Where $G_{i,j}^{(2)}(\infty)$ is an average of $G_{i,j}^{(2)}$ (the second order correlation of pixels i and j) excluding −1, 0 and 1 clock delays and $n_k$ is the total number of photons measured in detector k. Note that we assume here that crosstalk probabilities are symmetric to the exchange of i and j; i.e. the probability of a photon detection in pixel i resulting in a crosstalk detection in pixel j is equal to that of a photon detection in pixel j leading to a crosstalk detection in pixel i.

Figure 2B:
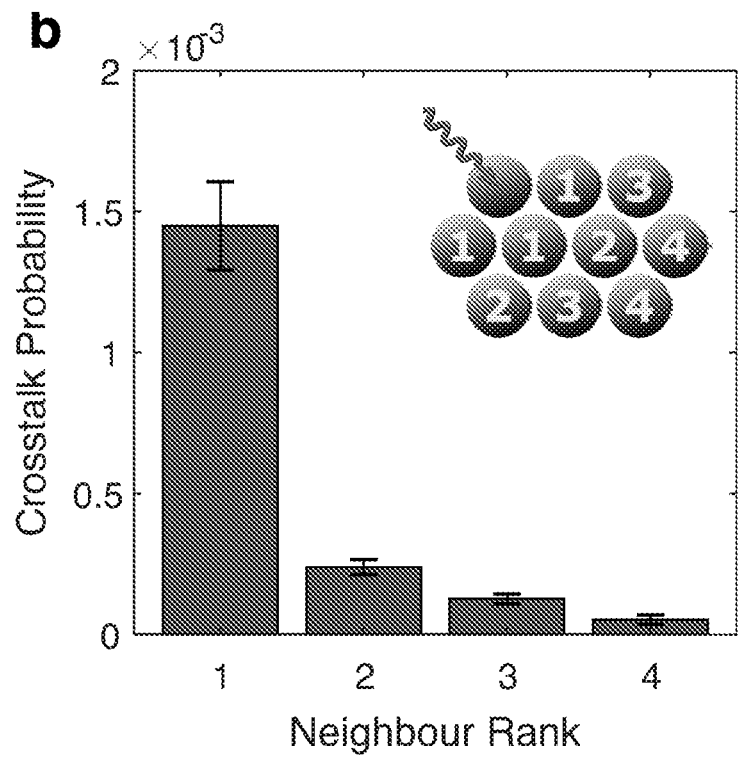
Figure 2C:
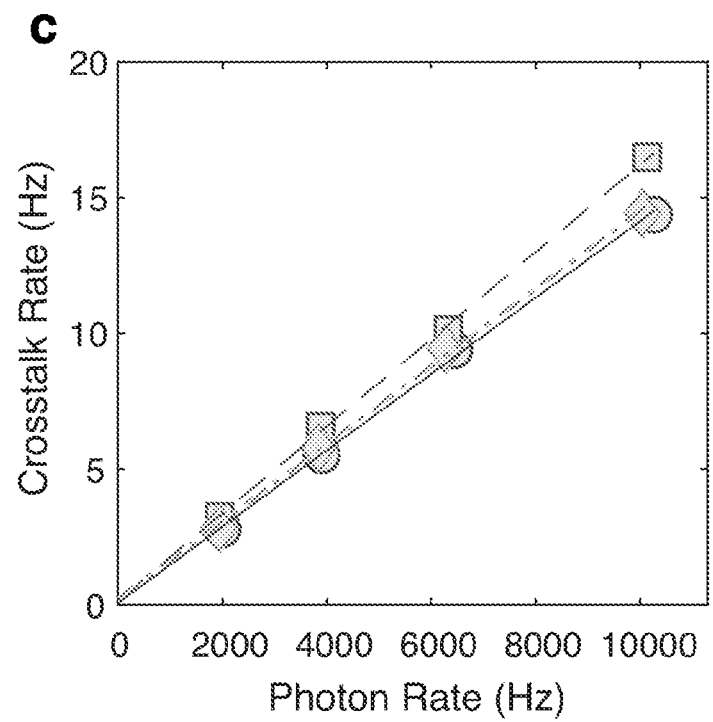
Figure 2D:
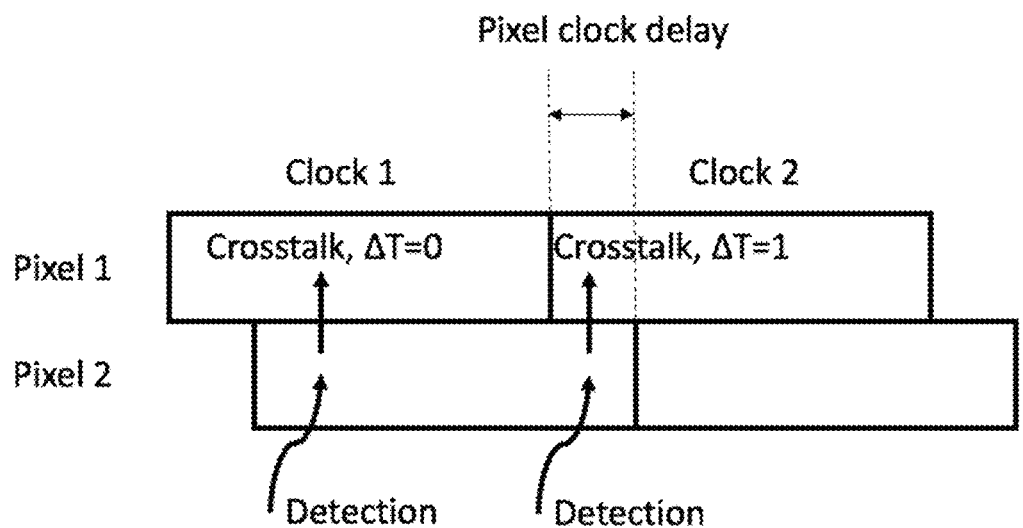

FIG. 2B represents the mean values of these probabilities over all pairs at four inter-detector distances in the array. The probability for a false detection pair is $1.4·10^{-3} \pm 1.6·10^{-4}$ for nearest neighbor pixel pairs, while the corresponding value for next nearest neighbors is lower by a factor of ~6. To test the linearity of optical crosstalk, FIG. 2C represents the $p_{CT}$ for three different detector pairs, shown with circles, squares and diamonds, versus the rate of detected photons. Linear fits of the data, shown with solid, dashed and dotted-dashed lines respectively show that at illumination levels well below the detector saturation, optical crosstalk is linear with the number of detected photons. Additional experiments, presented below, show that there are no noticeable short or long term temporal variations in the crosstalk probabilities.

With respect to second order photon antibunching, while optical crosstalk generates unwanted correlations at short time scales, its linear dependence on the number of detections allows us to pre-characterize it and subtract an estimated correction from any photon correlation measurement. In the following, the SPAD array is employed as a confocal microscope detector in order to test its ability to characterize a quantum state of light in a photon-starving microscopy application by applying a crosstalk correction to the measured $G^{(2)}$ function.

Figure 3A:
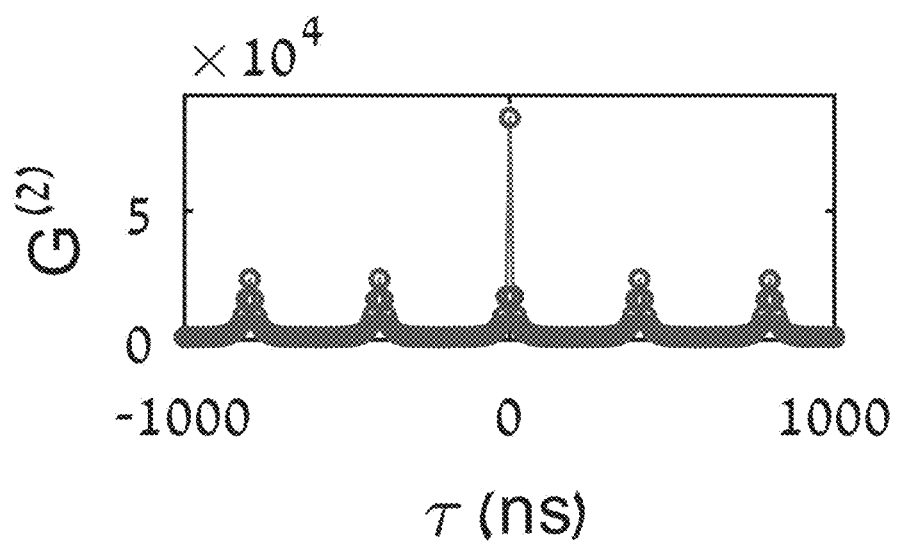
FIGS. 3A to 3E show graphs that represent second order photon correlations measured with the above described system. Second order photon arrival time correlations are represented in FIG. 3A for classical light (large ensemble of QDs), in FIG. 3B for classical light after crosstalk correction.

As an initial test, a classical light is generated, following Poissonian statistics, by exciting a drop of a dense solution of core/shell CdSe/CdS/ZnS quantum dots (QDs). Some information to this regard can be found in reference 20, this reference herewith incorporated by reference in its entirety. To estimate the second order correlation function, $G^{(2)}(\tau)$, photon pairs are histogrammed from the entire detector array according to the time difference between the two detections. An analysis of a photon trace from the whole SPAD array produced during a ~103 second exposure is shown in FIG. 3A. At non-zero time delays one can observe correlation peaks centered at integer multiples of the laser inter-pulse separation broadened by the QD's emission lifetime. In contrast, a narrow crosstalk peak at zero time delay. Although the probability for crosstalk is much smaller than unity, this peak overwhelms the photon correlation features since the occurrence of crosstalk is more probable than that of two photons in any specific time delay. To correct for the effect of optical crosstalk and estimate the light-only second order correlation the photon second order correlation function $G_{ph}^{(2)}$ is defined in Equation (2):

$$G_{ph}^{(2)}(\tau) = \begin{cases} G_{meas}^{(2)}(0) - \sum_{i \neq j} n_i \cdot p_{i,j}^{CT} & \tau = 0 \\ G_{meas}^{(2)}(\tau) & \tau \neq 0 \end{cases} \quad \text{Eq. (2)}$$

where $G_{meas}^{(2)}$ is the as-measured correlation function, $G_{ph}^{(2)}$ is the corrected correlation function excluding crosstalk effects and the summation is over all detector pairs excluding the diagonal terms (i=j). The correction term for the zero delay point applies the pre-characterized crosstalk probabilities $p_{i,j}^{CT}$.

Figure 3B:
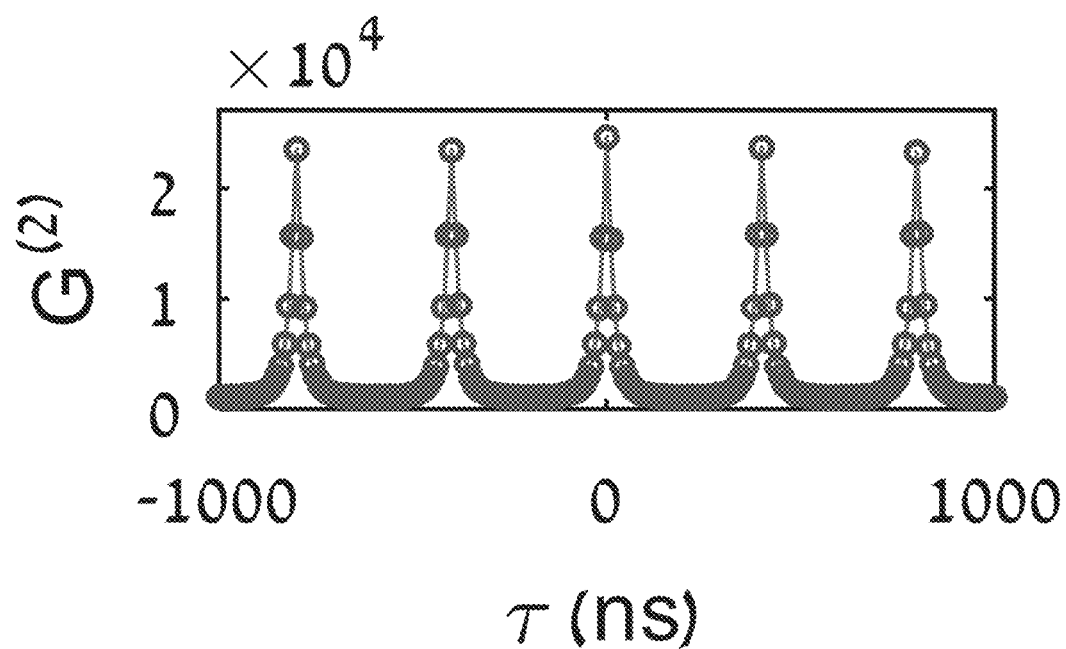

The photon second order correlation function ($G_{ph}^{(2)}$), shown in FIG. 3B, presents a featureless peak at zero time delay similar in height and width to the neighboring peaks. The normalized value of the second order correlation function matches the expected value of 1 for classical light, deviating by less than 0.1%. The agreement with theory indicates that with appropriate crosstalk correction the SPAD array performs well as a HBT setup in low light conditions.

Figure 3C:
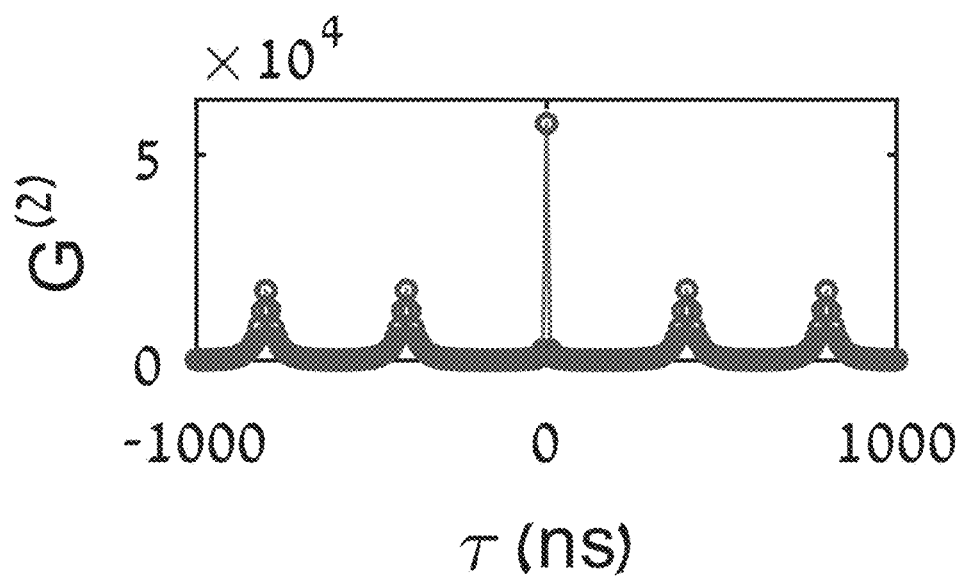
Figure 3D:
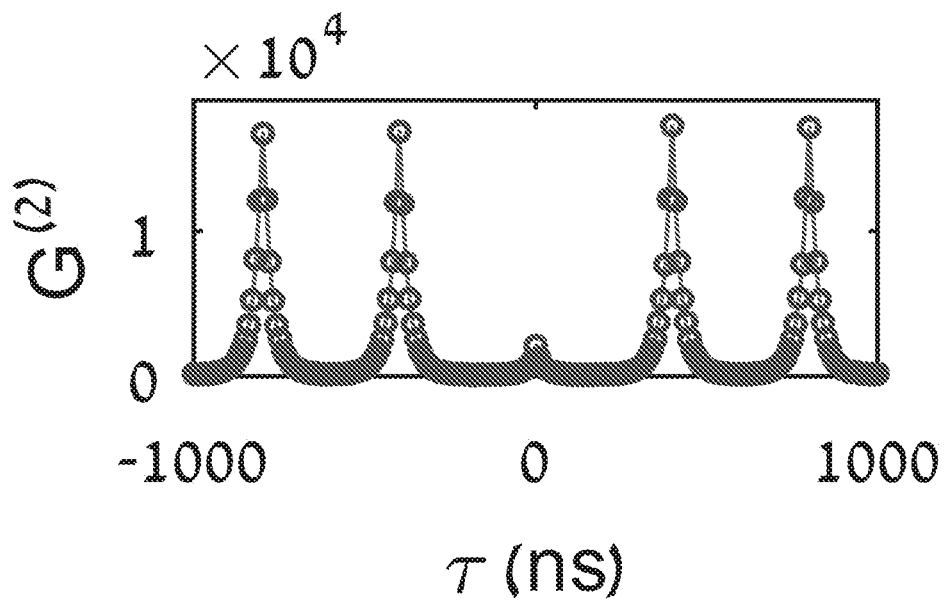
Figure 3E:
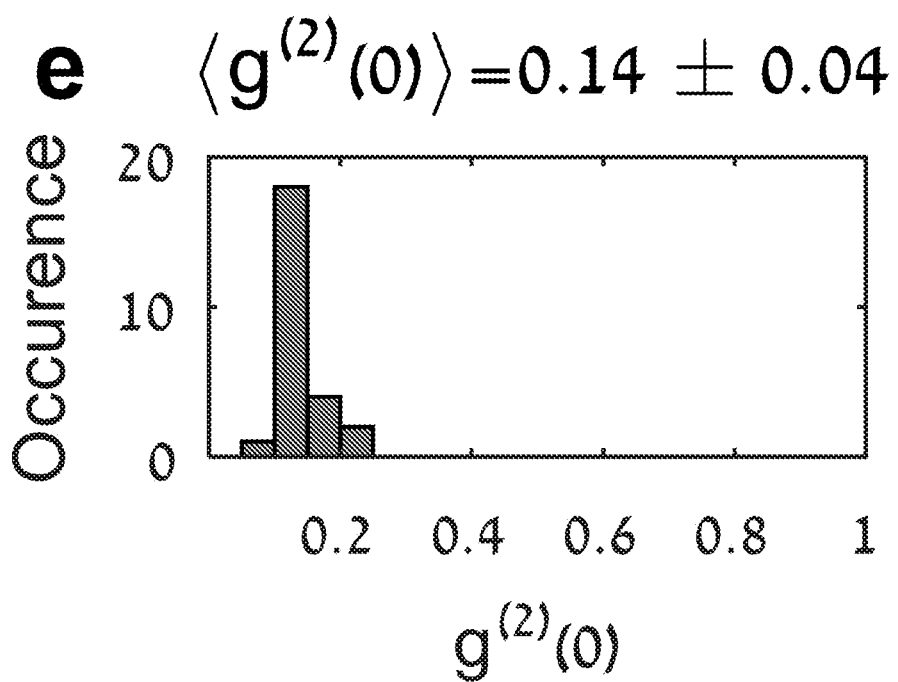

To demonstrate the applicability of an on-chip SPAD array as a detector of quantum light, individual QDs sparsely dispersed in a spin coated film on a glass cover slip are measured. Single QDs are well-known as single-photon-at-a-time emitters, the emission of two photons within the same radiative lifetime is strongly inhibited, as shown in reference 32, this reference herewith incorporated by reference in its entirety. FIG. 3C presents a photon correlation analysis of such a measurement. As shown in FIG. 3A, here too, the zero delay crosstalk feature is the most prominent one. However, once the crosstalk estimate is subtracted, as shown in FIG. 3D, the correlation peak around zero delay is considerably lower than the non-zero delay peaks, as expected from an antibunched source of light. FIG. 3E shows the normalized value of the correlation function, $g^{(2)}(0)$, for twenty-four (24) single QD measurements featuring a relatively narrow distribution with an average value of 0.14.

Figure 4A:
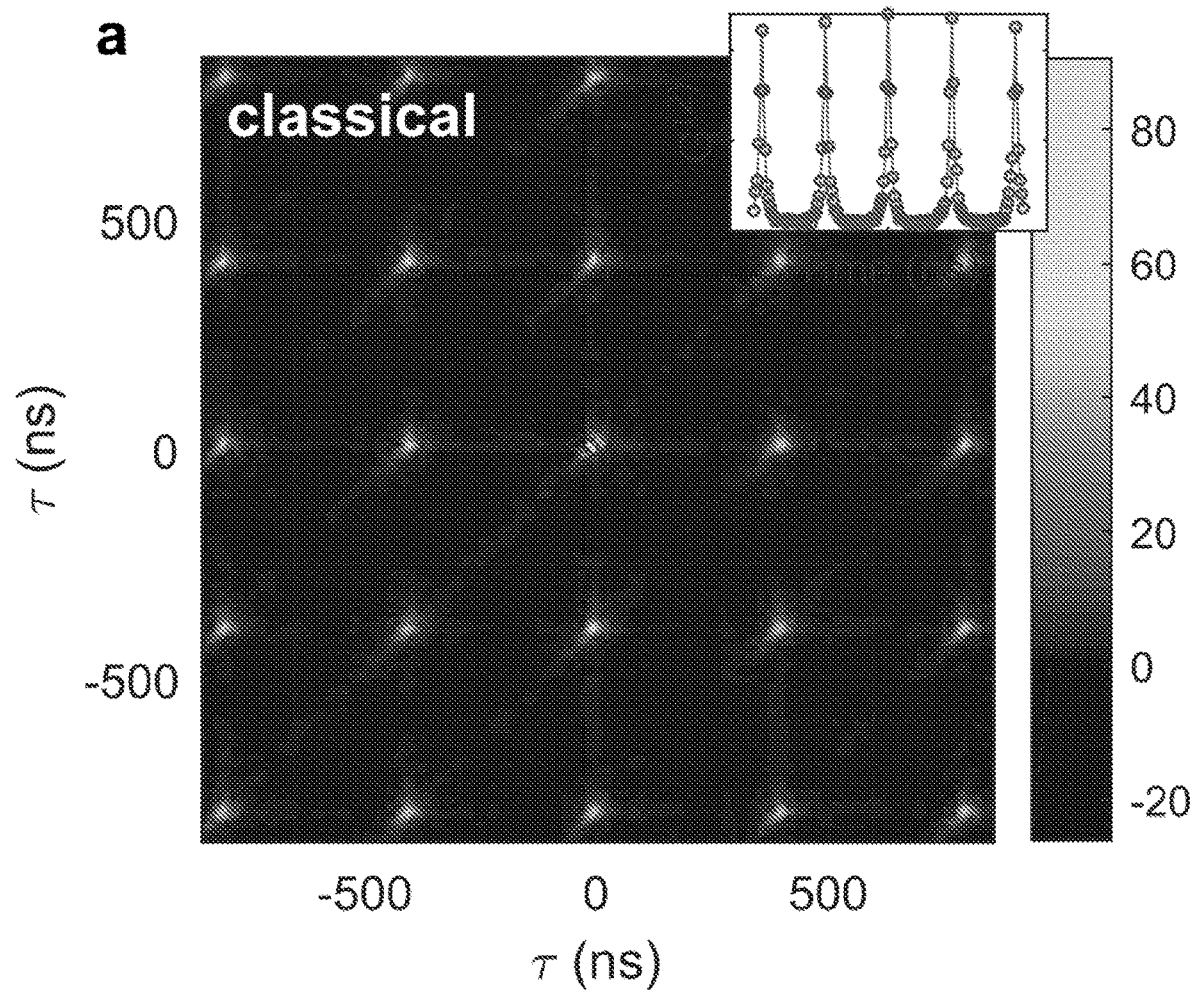
FIGS. 4A to 4D show graphs representing third order photon correlations. Crosstalk corrected third order photon correlations are represented for classical light (large ensemble of QDs) in FIG. 4A, single QD for classical light in FIG. 4B. Each triplet of photons arriving within 4 µs of each other, were randomly assigned the numbers 0 to 2. The horizontal and vertical axis represent the time delay between photons 0 and 1 and between photons 0 and 2 respectively. The grey scale bar represents the number of triplets ($t_{clk}$=10 ns binning in both axes), while negative values are a result of crosstalk over-correction. The observed grid of peaks corresponds to the 2.5 MHz frequency of the pulsed excitation. The profile of the peaks matches the fluorescence lifetime of the QDs. Note the decimation of peaks along the two axis and one of the diagonals in FIG. 4B, indicating photon antibunching (low $g^{(2)}(0)$). Insets are the second order correlation estimations attained by full vertical binning of the $G^{(3)}$ (third order correlation) values.

With respect to third order photon antibunching, realizing an HBT setup with an on-chip SPAD array offers flexibility and scalability in the measurement of photon correlations. An example of this advantage is the possibility of measuring photon correlation of orders higher than two (2). A measurement of the third order photon correlation would typically require upgrading the experimental setup to include further optical elements, detectors and time-to-digital converting channels, as discussed in references 3 and 4, these references herewith incorporated by reference in their entirety. An on-chip SPAD array used in a confocal setup offers the opportunity to split the light between multiple channels without any modifications to the experimental setup. In fact, the same data set used to produce the $G^{(2)}(\tau)$ curves shown in FIGS. 3B and 3D is used to analyze the third order correlation function, $G^{(3)}(\tau_1, \tau_2)$, shown in FIGS. 4A and 4B respectively. To generate these, photon triplets from the time trace according to the difference in their arrival time are histogrammed.

Note that the triplets lying on the $\tau_1=0$, $\tau_2=0$ and $\tau_1=\tau_2$ include two simultaneous detections whereas the origin point $\tau_1=\tau_2=0$ contains three detection within $t_{clk}$. In order to correctly evaluate $G^{(3)}(\tau_1, \tau_2)$ at the above mentioned time points, it is imperative to subtract the contribution of crosstalk at these points. Herein, we qualitatively describe hereinafter the different crosstalk terms that need to be accounted for. At the origin point, in particular, one has to consider three types of crosstalk events leading to false positive detection triplets, schematically shown in FIG. 4C. In the first type, following a coincidental pair of photo-induced avalanches, crosstalk from one of them might lead to a detection in a third detector (i). Additionally, an event in which only one of the three detections is due to a photon can occur in one of two ways, termed here serial (ii) and parallel (iii). In a serial event, a detected photon leads to crosstalk detection in a second detector, which in turn results in crosstalk detection at a third detector. A parallel third order crosstalk event consists of a single photo-detection leading to the emission of light detected by two neighboring pixels.

Figure 4B:
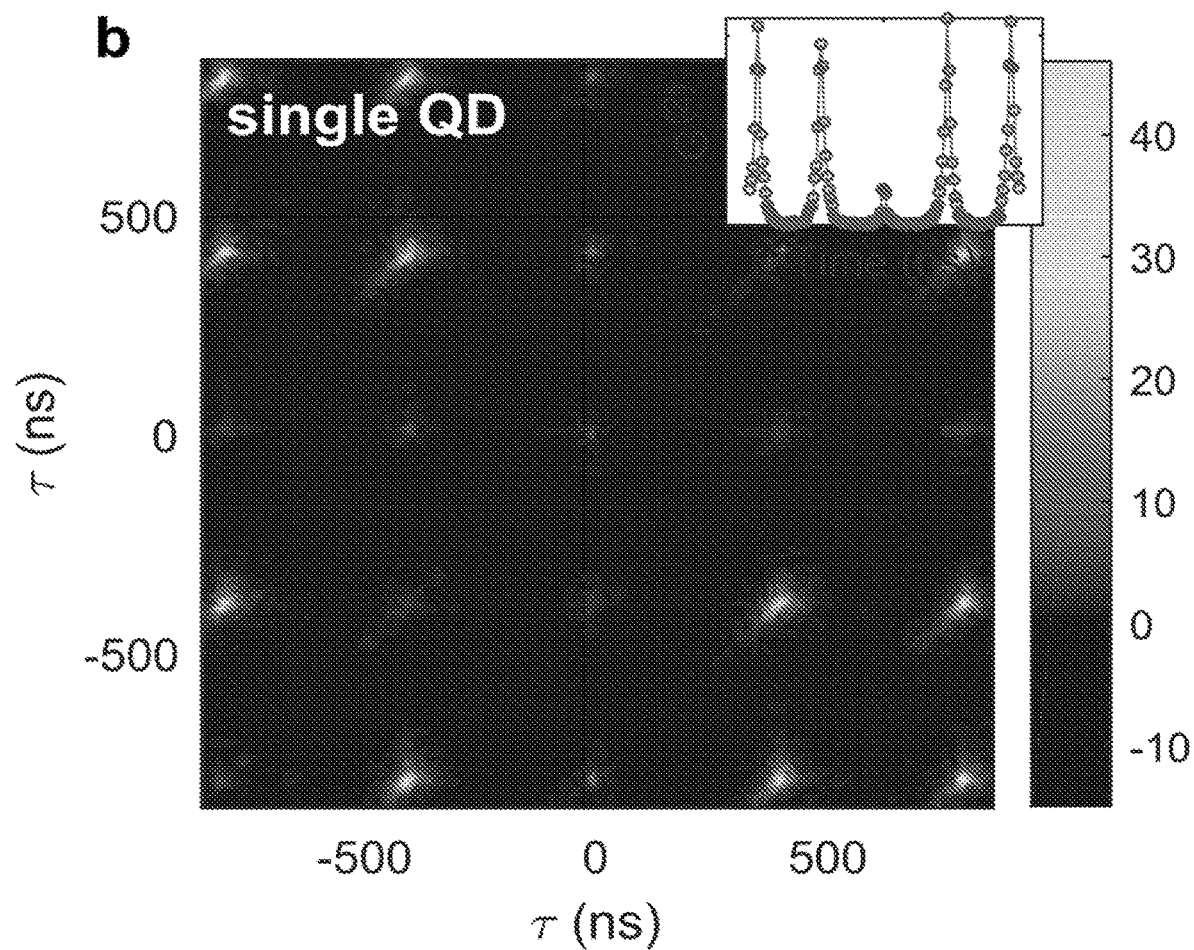
Figure 4C:
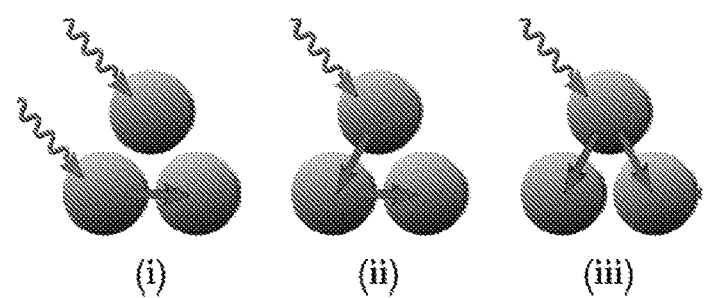
Figure 4D:
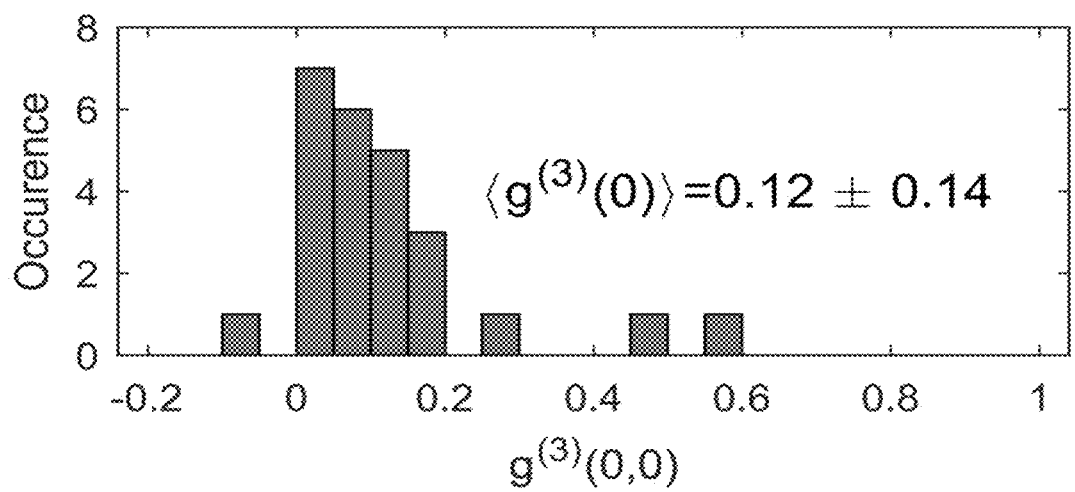

After proper subtraction of the estimate for all these contributions for a single QD we obtain the crosstalk corrected $G_{ph}^{(3)}$ function seen in FIG. 4B. Because a single QD preferentially emits only one photon at a time, peaks centered on the three above mentioned lines are highly attenuated (by a factor of $g^{(2)}(0)$). The further attenuation of the zero delay peak around the origin, is due to third order antibunching, presumably stemming from an Auger recombination process of three excitons inhibiting the QD at the same time, as discussed in the reference 33, this reference herewith incorporated by reference in its entirety. FIG. 4D summarizes the estimates for $g^{(3)}(0,0)$ for 24 different QDs. The distribution around zero value demonstrates that third order antibunching is evident in all our measurements.

With respect to the device or system operating for quantum image scanning microscopy, to showcase capabilities of the device or system to quantum optics and imaging science, an implementation of the recently introduced Q-ISM technique is demonstrated, as explained in the reference 29, this reference herewith incorporated by reference in its entirety. This is a new super-resolution scheme, utilizing the measurement of quantum correlations in an image scanning microscopy (ISM) architecture. Essentially, during a confocal scan, the standard pinhole and detector are replaced with a detector array. Merging the scanned images generated by each detector according to their spatial offsets, one can achieve the resolution enhancement of a narrow confocal pinhole while retaining the collection efficiency of a wide confocal pinhole (ISM), as discussed in references 34, 35, these references herewith incorporated by reference in their entirety.

In Q-ISM, photon detections in each pair of detectors in the array are correlated during the confocal scan, to generate multiple $\Delta G^{(2)} = G^{(2)}(\infty) - G^{(2)}(0)$ images. Imaging photon pairs (or rather missing photon pairs at zero time delay) instead of single photons, results in a narrower effective PSF, as shown in the reference 29, this reference herewith incorporated by reference in its entirety. The $\Delta G^{(2)}$ images are merged together as in the ISM technique, to form a super resolved image. This image surpasses the resolution of standard ISM by violating the classical light assumption at the basis of Abbe's diffraction limit, as explained in reference 36, this reference herewith incorporated by reference in its entirety.

Figure 5A:
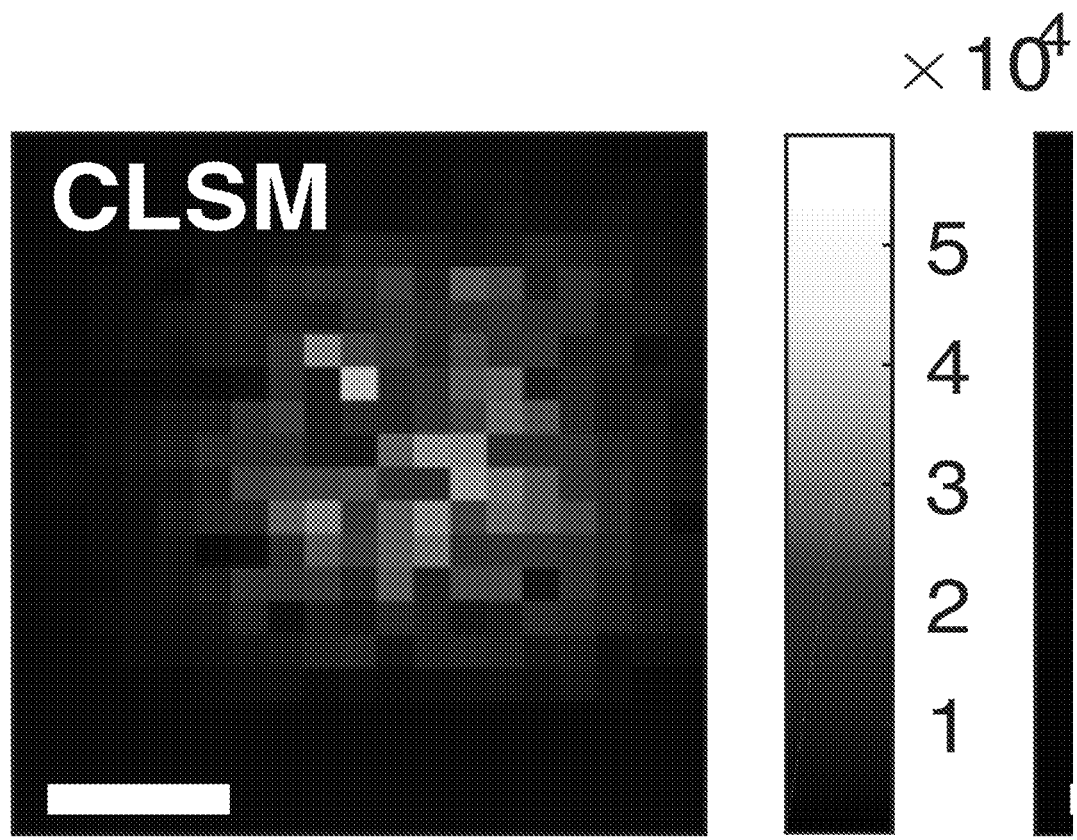
FIGS. 5A to 5D show images and a graph representing the narrowing of the point spread function when performing a quantum image scanning microscopy (Q-ISM) scan, with a 1 µm×1 µm confocal scan of a single CdSe/CdS/ZnS QD.
Figure 5B:
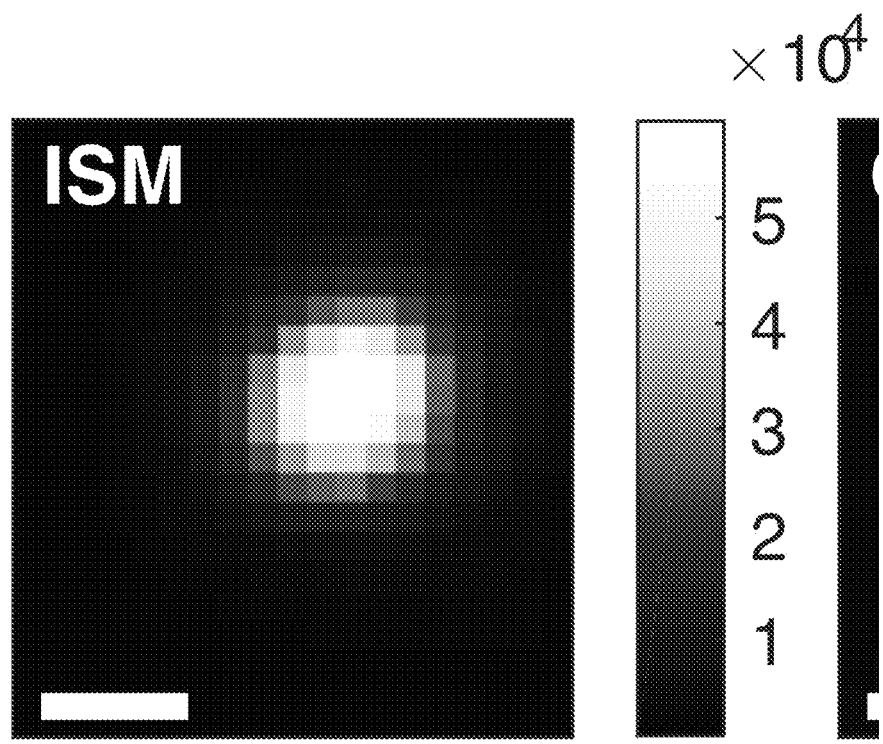
Figure 5C:
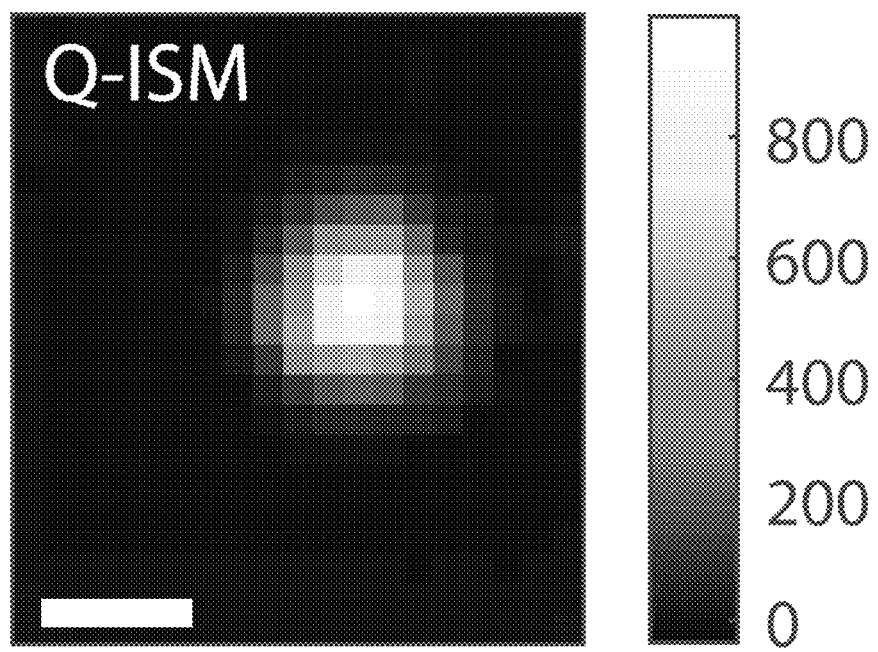
Figure 5D:
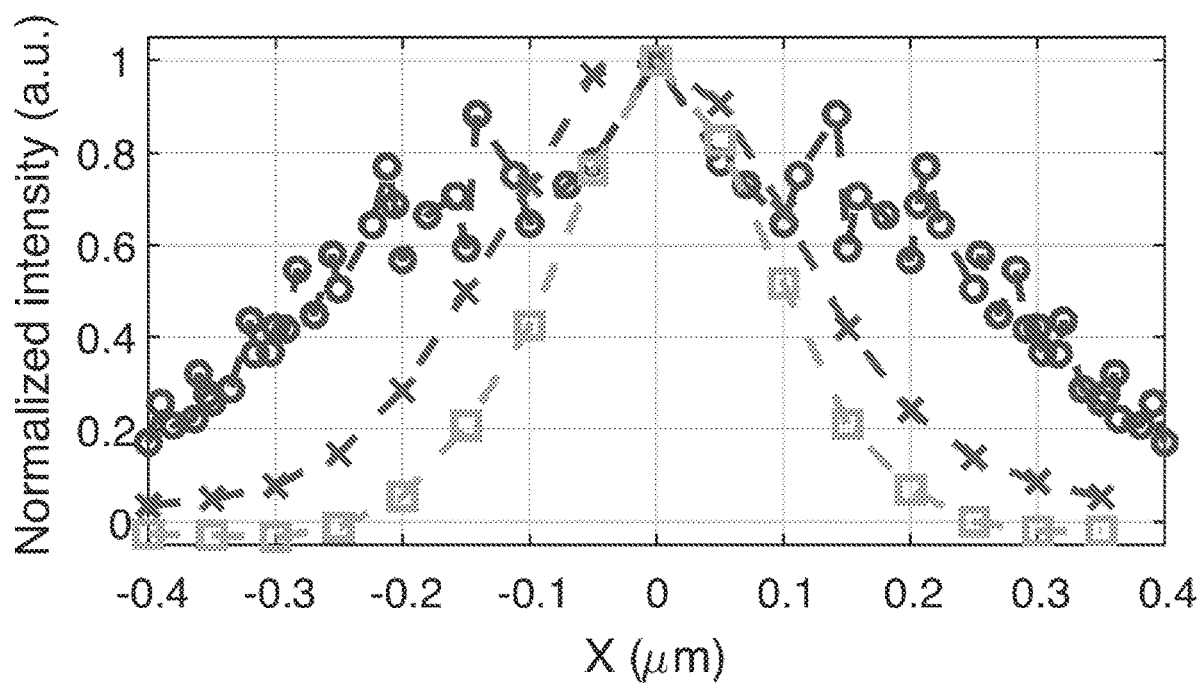

FIGS. 5A to 5D show a Q-ISM scan with the SPAD array setup. A CdSe/CdS/ZnS isolated QD was positioned at the center of a 1 μm×1 μm scan. FIG. 5A shows the result of summing counts of all detectors for every point in the scan. This is analogous to a confocal laser-scanning microscope (CLSM) with a broad pinhole, and is the reference for further resolution enhancements. FIGS. 5B and 5C show the ISM and Q-ISM images respectively, attained by the method described above from the same scan data. FIG. 5D presents a comparison of cross sections for the different techniques—showing the PSF narrowing achieved by Q-ISM. Implementing this technique with a SPAD array, results in a simple, compact and cheap setup when compared to the original fiber bundle camera, highlighting the benefits of using SPAD arrays in such schemes.

Compared with previous PNR solutions, the present method, system, and device, using spatial multiplexing with a monolithic or single-chip SPAD arrays 30 has some substantial advantages over the state of the art. First, the implementation of the method, system, and device is relatively simple for the end-user as it does not require cryogenics as is the case for TES and VLPC detectors, as discussed in reference 12. In comparison with time multiplexing approaches, the present method, system and device does not require the manufacturing or provision of complex and costly fiber systems which are mostly compatible only with single spatial mode operation, see for example in references 14, 15, and 37. In fact, the detector array used for the method, system and device here can be mounted in the image plane of any confocal microscope making it an attractive solution for quantum based imaging and quantum spectroscopy of nanostructures. In addition, the determination of the temporal characteristic of the signal is quite robust. While time multiplexed detectors require short pulses with a low repetition rate, TES has a temporal resolution of tens of nanoseconds, as shown in reference 11, and both VLPC and TES typically operate up to a 100 KHz repetition rate, as shown in reference 12, CMOS SPAD arrays are limited only by the sub-nanosecond temporal jitter of the SPADs, as discussed in references 38, 39. While the effect of saturation becomes substantial at ~1 MHz per pixel, as demonstrated by reference 28, scaling-up the number of detectors can allow operation, in principle, of up to hundreds of MHz.

The present method, system, and device can suffer from the detection pile-up effect, as shown in references 37, 40, and in this respect, two or more photons can impinge on the same pixel (or time bin) yielding only a single 'click', interpreted as one photon. While this effect limits trustworthy detection of multiple photons, it can be alleviated by scaling up the number of pixels in an array, as shown in reference 40, this reference herewith incorporated by reference in its entirety. The compatibility of the manufacturing process of monolithic SPAD arrays with CMOS technology offers an affordable path to scale-up the number of pixels to a few thousands with small changes to the design and performance, as shown by reference 25. The combination of scalability with low DCR can offer a substantially higher PNR dynamic range than anything that has been proposed by the state of the art. Similarly to other PNR detectors, suffering from inter-detector cross-talk, the subtraction or correction of the cross-talk signal introduces an additional source of noise, as shown by the reference 43. As discussed in a previous section, the background term in the zero delay correlation functions is much larger than the signal term. As a result, the shot noise on the number of simultaneous photon pairs is the main source of error for the estimation of $g^{(2)}(0)$ and $g^{(3)}(0,0)$.

The SPAD voltage bias increases both the optical crosstalk probability (due to a larger charge flow) and photon detection probability (PDP). The crosstalk probability is linearly proportional to the SPAD voltage bias, while PDP saturates at higher SPAD voltage bias. Thus, to reduce the relative effect of crosstalk, the SPAD voltage bias could be decreased and/or the illumination intensity increased in such a way that the optical crosstalk rate is reduced compared to the photon detection rate.

In recent years, the application of quantum technologies such as quantum sensing, quantum imaging and quantum communication has attracted a lot of interest. Most of the demonstrated methods in all three areas rely on sensitive multi-port detection of light for the characterization of quantum states of light. According to some aspects of the present invention, a CMOS SPAD array offers a low-noise, compact and cost effective way of performing such measurements. The demonstration of super-resolution imaging based on the concept of Q-ISM shown herein is an example of one of several concepts that have recently emerged in the field of quantum imaging. These include the enhancement of super-resolution microscopy based on localization microscopy and structured illumination, as well as surpassing the classical limits for phase and absorption sensitivity. With the present method, system and method, for the first time, a quantum imaging modality is presented with a monolithic detector array. The present method, system, and device allows to implement an inexpensive detector enabling their application in life-science imaging, by using a scaled-up widefield version thereof. In addition to quantum imaging, the few pixel detector used in this work can be used for characterization of nano-structured sources of quantum light such as quantum dots, organic molecules and solid-state defects. These functions can be performed in parallel with the standard acquisition of lifetime and intensity measurements that a single channel time correlated single photon counting system can perform.

In sum, the temporal photon correlations measurement that is instrumental to probing the quantum properties of light, requires multiple single photon detectors. Progress in single photon avalanche diode (SPAD) array technology highlights their potential as high performance detector arrays for correlation imaging and photon number resolving (PNR) applications. According to at least some aspects of the present invention, the potential of the SPAD has been developed by incorporating a novel on-chip SPAD array in a confocal microscope. This arrangement enables reliable measurements of second and third order photon correlations from classical and non-classical light sources. The present method, device and system overcomes the inter-detector optical crosstalk background even though it is over an order of magnitude larger than the faint signal of the present method, system, and device. To showcase the vast application space of such an approach, we implement a recently introduced super-resolution imaging method, quantum image scanning microscopy (Q-ISM), using a SPAD array. In sum, with at least some aspect of the present invention, the applicability of CMOS SPAD arrays as a scalable, easy to integrate detection array for photon correlation measurements. The implementation of this technique can lead to wide availability of high order correlation imaging systems. The scalability of the approach shows potential to wide-field photon correlation imaging, opening new research possibilities in quantum optics and life-science imaging.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

REFERENCES

1. R. Hanbury Brown and R. Q. Twiss, "A Test of a New Type of Stellar Interferometer on Sirius," Nature 178, 1046-1048 (1956).
2. H. J. Kimble, M. Dagenais, and L. Mandel, "Photon antibunching in resonance fluorescence," Phys. Rev. Lett. 39, 691-695 (1977).
3. M. J. Stevens, S. Glancy, S. W. Nam, and R. P. Mirin, "Third-order antibunching from an imperfect single-photon source," Opt. Express 22, 3244 (2014).
4. H. Ta, A. Kiel, M. Wahl, and D. P. Herten, "Experimental approach to extend the range for counting fluorescent molecules based on photon-antibunching," Phys. Chem. Chem. Phys. 12, 10295-10300 (2010).
5. J. Kim, S. Takeuchi, Y. Yamamoto, and H. H. Hogue, "Multiphoton detection using visible light photon counter," Appl. Phys. Lett. 74, 902-904 (1999).
6. E. Waks, K. Inoue, W. Oliver, E. Diamanti, and Y. Yamamoto, "High-efficiency photon-number detection for quantum information processing," IEEE J. Sel. Top. Quantum Electron. 9, 1502-1511 (2003).
7. B. Cabrera, R. M. Clarke, P. Colling, A. J. Miller, S. Nam, and R. W. Romani, "Detection of single infrared, optical, and ultraviolet photons using superconducting transition edge sensors," Appl. Phys. Lett. 73, 735-737 (1998).
8. A. J. Miller, S. W. Nam, J. M. Martinis, and A. V. Sergienko, "Demonstration of a low-noise near-infrared photon counter with multiphoton discrimination," Appl. Phys. Lett. 83, 791-793 (2003).
9. W. Luo, Q. Weng, M. Long, P. Wang, F. Gong, H. Fang, M. Luo, W. Wang, Z. Wang, D. Zheng, W. Hu, X. Chen, and W. Lu, "Room-Temperature Single-Photon Detector Based on Single Nanowire," Nano Lett. 18, 5439-5445 (2018).
10. E. J. Gansen, M. A. Rowe, M. B. Greene, D. Rosenberg, T. E. Harvey, M. Y. Su, R. H. Hadfield, S. W. Nam, and R. P. Mirin, "Photon-number-discriminating detection using a quantum-dot, optically gated, field-effect transistor," Nat. Photonics 1, 585-588 (2007).
11. A. E. Lita, A. J. Miller, and S. W. Nam, "Counting near-infrared single-photons with 95% efficiency," Opt. Express 16, 3032-3040 (2008).
12. M. D. Eisaman, J. Fan, A. Migdall, and S. V. Polyakov, "Invited Review Article: Single-photon sources and detectors," Rev. Sci. Instruments 82 (2011).
13. R. H. Hadfield, "Single-photon detectors for optical quantum information applications," Nat. Photonics 3, 696-705 (2009).
14. D. Achilles, C. Silberhorn, C. Śliwa, K. Banaszek, and I. A. Walmsley, "Fiber-assisted detection with photon number resolution," 28, 2387-2389 (2003).
15. M. J. Fitch, B. C. Jacobs, T. B. Pittman, and J. D. Franson, "Photon-number resolution using time-multiplexed single-photon detectors," Phys. Rev. A—At. Mol. Opt. Phys. 68, 6 (2003).
16. M. Micuda, O. Haderka, and M. Ježek, "High-efficiency photon-number-resolving multichannel detector," Phys. Rev. A—At. Mol. Opt. Phys. 78, 1-4 (2008).
17. A. Divochiy, F. Marsili, D. Bitauld, A. Gaggero, R. Leoni, F. Mattioli, A. Korneev, V. Seleznev, N. Kaurova, O. Mi-naeva, G. Gol'Tsman, K. G. Lagoudakis, M. Benkhaoul, F. Lévy, and A. Fiore, "Superconducting nanowire photon-number-resolving detector at telecommunication wavelengths," Nat. Photonics 2, 302-306 (2008).

18. P. Eraerds, M. Legré, A. Rochas, H. Zbinden, and N. Gisin, "SiPM for fast Photon-Counting and Multiphoton Detection," Opt. Express 15, 14539-14549 (2007).
19. L. A. Jiang, E. A. Dauler, and J. T. Chang, "Photon-number-resolving detector with 10 bits of resolution," Phys. Rev. A—At. Mol. Opt. Phys. 75, 2-6 (2007).
20. O. Schwartz, J. M. Levitt, R. Tenne, S. Itzhakov, Z. Deutsch, and D. Oron, "Superresolution microscopy with quantum emitters," Nano Lett. 13, 5832-5836 (2013).
21. R. Fickler, M. Krenn, R. Lapkiewicz, S. Ramelow, and Zeilinger, "Real-time imaging of quantum entanglement," Sci. Reports 3, 1-5 (2013).
22. R. Lussana, F. Villa, A. D. Mora, D. Contini, A. Tosi, and F. Zappa, "Enhanced single-photon time-of-flight 3D ranging," Opt. Express 23, 24962-24973 (2015).
23. I. M. Antolovic, S. Burri, C. Bruschini, and R. A. Hoebe, "OPEN SPAD imagers for super resolution localization microscopy enable analysis of fast fluorophore blinking," Nat. Publ. Group pp. 1-11 (2017).
24. M. Castello, G. Tortarolo, M. Buttafava, T. Deguchi, F. Villa, S. Koho, L. Pesce, M. Oneto, S. Pelicci, L. Lanzanó, P. Bianchini, C. J. R. Sheppard, A. Diaspro, A. Tosi, and G. Vicido-mini, "A robust and versatile platform for image scanning microscopy enabling super-resolution FLIM," Nat. Methods 16, 175-178 (2019).
25. C. Bruschini, H. Homulle, and E. Charbon, "Ten years of biophotonics single-photon SPAD imager applications: retrospective and outlook," p. 100691S (2017).
26. I. Rech, A. Ingargiola, R. Spinelli, I. Labanca, S. Marangoni, M. Ghioni, and S. Cova, "Optical crosstalk in single photon avalanche diode arrays: a new complete model," Opt. Express 16, 8381 (2008).
27. A. Ficorella, L. Pancheri, G. F. Betta, P. Brogi, G. Col-lazuol, P. S. Marrocchesi, F. Morsani, L. Ratti, and A. Savoy-Navarro, "Crosstalk mapping in CMOS SPAD arrays," Eur. Solid-State Device Res. Conf. 2016-October, 101-104 (2016).
28. I. M. Antolovic, C. Bruschini, and E. Charbon, "Dynamic range extension for photon counting arrays," Opt. Express 26, 22234 (2018).
29. R. Tenne, U. Rossman, B. Rephael, Y. Israel, A. Krupinski-Ptaszek, R. Lapkiewicz, Y. Silberberg, and D. Oron, "Super-resolution enhancement by quantum image scanning microscopy," Nat. Photonics (2018).
30. W. J. Kindt, H. W. van Zeijl, and S. Middelhoek, "Optical Cross Talk in Geiger Mode Avalanche Photodiode Arrays: Modeling, Prevention and Measurement," in 28th European Solid-State Device Research Conference, (1998), pp. 192-195.
31. B. F. Aull, D. R. Schuette, D. J. Young, D. M. Craig, B. J. Felton, and K. Warner, "A study of crosstalk in a 256×256 photon counting imager based on silicon Geiger-mode avalanche photodiodes," IEEE Sensors J. 15, 2123-2132 (2015).
32. P. Michler, A. Kiraz, C. Becher, W. V. Schoenfeld, P. M. Petroff, L. Zhang, E. Hu, and A. Imamoglu, "A quantum dot single-photon turnstile device," Science. 290, 2282-2285 (2000).
33. V. I. Klimov, V. I. Klimov, A. A. Mikhailovsky, and D. W. Mcbranch, "Quantization of Multiparticle Auger Rates in Semiconductor Quantum Dots," Science. 1011, 1011-1014 (2008).
34. C. J. R. Sheppard, "Super-resolution in confocal imaging," Optik. 80, 53-54 (1988).
35. C. B. Müller and J. Enderlein, "Image scanning microscopy," Phys. Rev. Lett. 104, 1-4 (2010).
36. E. Abbe, "Beiträge zur Theorie des Mikroskops und der mikroskopischen Wahrnehmung," Arch. für mikroskopische Anat. 9, 413-418 (1873).
37. R. Kruse, J. Tiedau, T. J. Bartley, S. Barkhofen, and C. Silberhorn, "Limits of the time-multiplexed photon-counting method," Phys. Rev. A 95, 1-5 (2017).
38. F. Villa, B. Markovic, S. Bellisai, D. Bronzi, A. Tosi, F. Zappa, S. Tisa, D. Durini, S. Weyers, U. Paschen, and W. Brock-herde, "SPAD smart pixel for time-of-flight and time-correlated single-photon counting measurements," IEEE Photonics J. 4, 795-804 (2012).
39. S. Burri, H. Homulle, C. Bruschini, and E. Charbon, "LinoSPAD: a time-resolved 256×1 CMOS SPAD line sensor system featuring 64 FPGA-based TDC channels running at up to 8.5 giga-events per second," Opt. Sens. Detect. IV 9899, 98990D (2016).
40. F. M. Miatto, A. Safari, and R. W. Boyd, "Explicit formulas for photon number discrimination with on/off detectors," Appl. Opt. 57, 6750 (2018).
41. D. Bronzi, S. Tisa, F. Villa, F. Zappa, and A. Tosi, "SPAD Figures of Merit for Photon-Counting, Photon-Timing, and Imaging Applications: A Review," IEEE Sensors J. 16, 3-12 (2015).
42. G. Brida, I. P. Degiovanni, F. Piacentini, V. Schettini, S. V. Polyakov, and A. Migdall, "Scalable multiplexed detector system for high-rate telecom-band single-photon detection," Rev. Sci. Instruments 80, 116103 (2009).
43. J. Kröger, T. Ahrens, J. Sperling, W. Vogel, H. Stolz, and B. Hage, "High intensity click statistics from a 10×10 avalanche photodiode array," J. Phys. B: At. Mol. Opt. Phys. 50, 214003 (2017).

The invention claimed is:

1. A system for photon correlation of an illuminated object and/or a light source, the system comprising:
   a light source for illuminating the object or to correlate;
   an optical system having an object-facing side configured to face the object or the light source and a projection side, the projection side having a focal plane;
   at least one single-chip single photon avalanche photodiode (SPAD) array arranged at the focal plane;
   a timing circuit operatively connected with the at least one single-chip SPAD array for measuring arrival times of photons detected by the at least one single-chip SPAD array; and
   a data processor operatively connected to the timing circuit, the data processor configured to:
      obtain the measured arrival times of photons from the timing circuit, and
      calculate at least one of 1) a second order of correlation ($G^{(2)}$) in the measured arrival times of photons, and 2) a third order of correlation ($G^{(3)}$) in the measured arrival times of photons.

2. The system of claim 1, wherein the data processor is configured to read the data from the timing circuit and calculate a photon correlation image.

3. The system of claim 2, wherein the data processor is further configured to perform scanning measurement of a quantum image scanning microscopy (Q-ISM) image of the object.

4. The system of claim 2, wherein the light source illuminates the at least one single-chip SPAD array for characterization of photon correlations of light in a classical or quantum state.

5. The system of claim 1, wherein individual pixels of the at least one single-chip SPAD array have minimized electrical crosstalk by substrate isolation and minimized optical crosstalk by at least one of active quenching and opaque deep trench isolation.

6. A method to decrease crosstalk probability with respect to photon detection rate with the system according to claim 1 comprising the steps of:
lowering a SPAD bias voltage; or
increasing a photon detection rate by increasing illumination intensity,
wherein the crosstalk probability linearly decreases with a decrease of the SPAD bias voltage, and the photon detection rate decreases less than the crosstalk probability with the decrease of SPAD bias voltage.

7. The method of claim 6, further comprising the step of:
finding an optimum ratio between the crosstalk probability and photon detection rate by changing the SPAD bias voltage and the illumination intensity.

8. A method to minimize residual cross-talk correlations at −1 and +1 clock delays with the system according to claim 1, the method comprising:
synchronizing a frequency of a clock with a pulsed laser of the light source and positioning the pulsed laser of the light source precisely in a middle of a clock period.

9. The system according to claim 1, wherein the data processor is further configured to calculate an optical crosstalk between different single photon avalanche photodiodes of the at least one single-chip SPAD array.

10. The system according to claim 1, wherein the data processor is further configured to calculate a crosstalk probability $p_{i,j}^{CT}$ that is a probability that a detection in the single photon avalanche photodiode of a pixel (i) will lead to a false detection in the at least one single photon avalanche photodiode of a pixel (j), the crosstalk probability $p_{i,j}^{CT}$ for each detector pair being calculated from the second order of correlation ($G^{(2)}$) in the measured photon arrival times according to the equation:

$$p_{i,j}^{CT} = \frac{G_{i,j}^{(2)}(0) - G_{i,j}^{(2)}(\infty)}{n_i + n_j}$$

where $G_{i,j}^{(2)}(\infty)$ is an average of $G_{i,j}^{(2)}$; $G_{i,j}^{(2)}$ being the second order of correlation $G^{(2)}$ in the measured photon arrival times of the pixels i and j excluding clock delays attributed to inter-detector optical crosstalk; and $n_i$ is the total number of photons measured in the single photon avalanche photodiode of the pixel i, and $n_j$ is the total number of photons measured in the single photon avalanche photodiode of the pixel j.

11. The system according to claim 10, wherein the data processor is further configured to calculate a corrected second order of correlation $G_{ph}^{(2)}(\tau)$, in which optical crosstalk between different single photon avalanche photodiodes is removed, according to the equation:

$$G_{ph}^{(2)}(\tau) = \begin{Bmatrix} G_{meas}^{(2)}(0) - \sum_{i \neq j} n_i \cdot p_{i,j}^{CT} & \tau = 0 \\ G_{meas}^{(2)}(\tau) & \tau \neq 0 \end{Bmatrix}$$

where $G_{meas}^{(2)}$ is the as-measured second order of correlation $G^{(2)}$ in the measured photon arrival times, and the summation is performed over all single photon avalanche photodiode pairs excluding the diagonal terms i=j; and $p_{i,j}^{CT}$ is the crosstalk probability.

12. The system according to claim 11, wherein the data processor is further configured to:
generate a plurality of images according to $\Delta G^{(2)} = G^{(2)}(\infty) - G^{(2)}(0)$ where $G^{(2)}$ is a corrected second order of correlation, and
form a super-resolved image using the plurality of images.

13. A method for characterizing cross-talk probabilities with a system for photon correlation, the system including,
a classical or pseudo-thermal light source for illuminating an object or to correlate,
an optical system having an object-facing side configured to face the object or the classical or pseudo-thermal light source and a projection side, the projection side having a focal plane,
at least one single-chip single photon avalanche photodiode (SPAD) array arranged at the focal plane, and
a timing circuit operatively connected with the at least one single-chip SPAD array for measuring arrival times of photons detected by the at least one single-chip SPAD array,
wherein the method, performed on a data processor operatively connected to the timing circuit, comprises:
obtaining the measured arrival times of photons from the timing circuit; and
calculating at least one of 1) a second order of correlation ($G^{(2)}$) in the measured arrival times of photons, and 2) a third order of correlation ($G^{(3)}$) in the measured arrival times of photons.

14. The method of claim 13, further comprising the step of:
characterizing residual cross-talk correlations at −1 and +1 clock delays resulting from pixel clock mismatches.

15. The method of claim 13, further comprising the step of:
using several spatially non-uniform illuminations provided by the classical or pseudo-thermal light source to characterize asymmetric cross-talk probabilities.

16. The method of claim 15, further comprising the step of:
using cross-talk correlations at multiple intensities to perform non-linear interpolation of a cross-talk probability for a correction of a given data set.

* * * * *